US00RE34986E

United States Patent [19]

Rathfelder et al.

[11] E Patent Number: Re. 34,986

[45] Reissued Date of Patent: Jul. 4, 1995

[54] TANNING AGENT FORMULATION FOR MANUFACTURE OF SEMIFINISHED LEATHER PRODUCTS

[75] Inventors: Paul Rathfelder, Boeblingen; Friedrich Landbeck, Holzgerlingen; Heinz Matschkal, Gaertringen; Jozef Sagala, Boeblingen, all of Germany

[73] Assignee: Schill & Seilacher GmbH & Co., Boeblingen, Germany

[21] Appl. No.: 157,620

[22] Filed: Nov. 24, 1993

Related U.S. Patent Documents

Reissue of:

[64] Patent No.: 5,011,499
Issued: Apr. 30, 1991
Appl. No.: 332,535
Filed: Apr. 3, 1989

[30] Foreign Application Priority Data

Apr. 2, 1988 [DE] Germany ..... 3811267

[51] Int. Cl.[6] ..... C14C 3/08
[52] U.S. Cl. ..... 8/94.33; 8/94.19 R
[58] Field of Search ..... 8/94.33, 94.19 R, 94.19 C, 8/94.2; 252/8.57

[56] References Cited

U.S. PATENT DOCUMENTS

| | | | |
|---|---|---|---|
| 2,880,053 | 3/1959 | Fein et al. | 8/94.33 |
| 2,886,401 | 5/1959 | Wells et al. | 8/94.33 |
| 2,941,859 | 6/1960 | Fein et al. | 8/94.33 |
| 3,080,281 | 3/1963 | Fischer et al. | 8/94.33 |
| 3,909,193 | 9/1975 | Erdmann et al. | 8/34.33 |

FOREIGN PATENT DOCUMENTS 2227598 12/1974 Germany .

OTHER PUBLICATIONS

C&EN, "Starch in Your Wallet", Dec. 9, 1957, pp. 58–59.

*Primary Examiner*—Prince Willis, Jr.
*Assistant Examiner*—Alan D. Diamond
*Attorney, Agent, or Firm*—Hayes, Soloway, Hennessey, Grossman & Hage

[57] ABSTRACT

A tanning agent formulation obtained by reacting 1 mole of an aliphatic $\omega,\omega'$-dialdehyde having 2–8 carbon atoms in the form of an aqueous solution of about 3–60% strength with about 0.2–4 moles of a hydroxy compound of the formula $$R_1—O—[(C_2H_4O)_x—(C_3H_6O)_y—C_4H_8O)_z]_n—H$$

whereby n is an integer from 0 to 10, x+y+z is an integer from 1 to 20, wherein the alkoxy groups may be arranged in any order, and $R_1$ is H, $C_1$–$C_{12}$ alkyl, or $C_1C_{12}$ alkyl having one or more hydroxyl groups, wherein n is not 0 for $R_1$=H is disclosed. Pelts pretanned with the formulation have improved mold resistance and are free of tanning metal salts and formaldehyde.

11 Claims, 2 Drawing Sheets

TANNING AGENT FORMULATION FOR MANUFACTURE OF SEMIFINISHED LEATHER PRODUCTS

Matter enclosed in heavy brackets [ ] appears in the original patent but forms no part of this reissue specification; matter printed in italics indicates the additions made by reissue.

BACKGROUND OF THE INVENTION

The invention relates to a novel tanning agent formulation. The invention also relates to a process for manufacturing semifinished leather products which employs said novel tanning agent formulation.

Chrome tanning has been an important chemical treatment in leather manufacture for over 100 years. For ecological reasons, however, possible alternatives to chrome tanning are being sought. In conventional chrome tanning processes, chromium salts are offered in an amount of 1.5–2.5% by weight of chromium(III) oxide, based on pelt weight, to obtain a leather which resists the boiling test. A considerable portion of the available chromium is neither bound by nor incorporated in the hide tissue and as a result passes into the wastewater.

It is true that chemical treatment of wastewaters (with lime and iron salts) brings about an appreciable reduction in the level of dissolved chromium, but the chromium reappears in the sludge cake which, for disposal, needs to be transported to a special landfill site.

The chrome shavings produced in the course of the leveling of leather represent a similar danger to the environment. The amount produced is relatively large, at 8–15%, based on hide weight, and its disposal is an increasing problem.

Attempts to improve the degree of exhaustion of chrome tanning liquors, and chrome recycling processes, where the residual liquors are reused for tanning directly, or after precipitation and working up to chrome tanning agents, do not overcome the problem of chromium-containing waste materials, for example shavings, trimmings and thin slivers from which no more leather is to be had.

The need of the moment is therefore to propose an alternative process for reducing the chromium content in tannage wastes and wastewater to such an extent that the problems of disposal are largely eliminated.

The possibilities come into consideration are not very large. Previous attempts to displace chromium salts from their dominating position in tanning by tanning agents of certain environmental acceptability, for example aluminum and zirconium salts, vegetable and synthetic tanning agents or products based on aldehydes, have heretofore not led to any solution which on an industrial scale is completely satisfactory.

In order to retain the generally acknowledged advantages of chrome tanning as regards leather quality while reducing the disadvantages of their waste disposal problems to a substantial extent, the following sequence of operations shall be chosen:

Phase 1: Pretanning without metal salts or formaldehyde

Pretanning is intended to confer adequate thermal stability on the pelts (shrinkage temperature Ts above 70° C.), so that mechanical treatments, such as samming, shaving or splitting, can be carried out satisfactorily.

The resulting waste materials shall not pollute the environment.

Phase 2: Variable final tanning

The leather character shall be determined by the appropriate choice of suitable tanning agents for the final tanning of the pretanned, hydroextracted, shaved or split material.

The prior art methods for pretanning rely on the use of known chromium-free products. These include vegetables, synthetic and in particular mineral tanning agents, for example aluminum and zirconium salts. These processes require appreciable amounts of tanning agents in order to achieve adequate stabilization of the hide tissue. The disadvantages here include appreciable pollution of the wastewater and the production of wastes which are difficult to utilize or dispose of, and adverse effects on the leather character.

There is some hope in the use of aldehydes in pretanning. The tanning effect of aldehydes and dialdehydes has been known for a long time. It has also been previously pointed out that the amounts required for adequate final tanning are relatively small. (See Herfeld, H., "Bibliothex des Leders", volume III, page 191, Umschau Verlag, Frankfurt/Main 1984.

In practice, the good tanning properties of glutardialdehyde make it the predominant aldehyde these days. In pretanning, however, the use of glutardialdehyde is difficult. If relatively small amounts of glutardialdehyde are used (0.5–0.8%, based on 100% aldehyde and based on the pelt weight), it is in general impossible to obtain shrinkage temperatures above 70° C. The resulting semifinished products are difficult to hydroextract. During shaving, the flesh side frequently undergoes denaturation (gelatinization), which has an adverse effect on the quality of the finished leather.

Measurements of the shrinkage temperature across the entire cross-section of the semifinished product show an interesting and revealing distribution (see FIG. 1 *which shows thermal stability ($T_s$)* in the leather cross-section after treatment with 0.5% of glutardialdehyde, based on 100% strength aldehyde and based on pelt weight).

The relatively low shrinkage temperatures in the middle layer of the semifinished product explain the difficulties observed in practice. The distribution of the shrinkage temperature becomes more and more uniform with increasing supplies of glutardialdehyde. At 1.5–2.0%, based on 100% strength aldehyde based on pelt weight, only small differences appear. The semifinished products thus obtained, however, constitute largely fully tanned leather.

The irreversible crosslinking of the hide tissue predetermines the final character of the finished leather and no longer permits any subsequent variable processing as desired by the tanner.

An improvement in the effectiveness of glutardialdehyde at lower concentrations (0.3–0.8%, based on 100% strength aldehyde and based on pelt weight) can only be expected from a more uniform distribution of the tanning molecules in the hide cross-section. To obtain diffusion, the astringent components must be inactivated reversibly, so that in the first pretanning phase crosslinking is suppressed and penetration is facilitated. Since the crosslinking of the collagen fibers with dialdehydes, in particular glutardialdehyde, is due not to a single compound, but to a plurality of compounds of which a part are still unknown (see Heidemann, E., et al., Leder 25 (12), 229, (1974); Anderson, P. J., J. Histochem. Cytochem. 15, 652 (1967); Robertson, A. A., et al., J. Ultrastruct. Res. 30, 275 (1970); Meek, M. K. et al., J. Mol. Biol. 185, 359 (1985); Tashima, T. et al., Chem. Pharm. Bull. 35, 4169 (1987)), the reversible stabilization should have a universal function.

SUMMARY OF THE INVENTION

Accordingly, it is an object of the present invention to provide an improved tanning agent formulation which avoids the disadvantages recited above.

Another object of the present invention is to provide an improved process for manufacturing semifinished leather products which have a long shelf life and are shavable or splittable.

In accomplishing the foregoing objectives, there has been provided, in accordance with one aspect of the present invention, a tanning agent formulation obtained by reacting 1 mole of an aliphatic ω,ω'-dialdehyde having 2–8 carbon atoms in the form of an aqueous solution of about 3–60% strength with about 0.2–4 moles of a hydroxy compound of the formula I $$R_1—O—[(C_2H_4O)_x—(C_3H_6O)_y—(C_4H_8O)_z]_n—H \quad (I)$$

whereby n is an integer from 0 to 10, x+y+z is an integer form 1 to 20, wherein the alkoxy groups may be arranged in any order, and $R_1$ is H, $C_1$–$C_{12}$ alkyl, or $C_1$–$C_{12}$ alkyl; having one or more hydroxyl groups, wherein n is not O for $R_1$=H.

In accordance with another aspect of the present invention there is provided a process for manufacturing a semifinished leather product by pretanning, comprising the steps of pickling a pelt and treating the pickled pelt with the above-described tanning agent formulation.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF PREFERRED EMBODIMENTS

Figure 1:
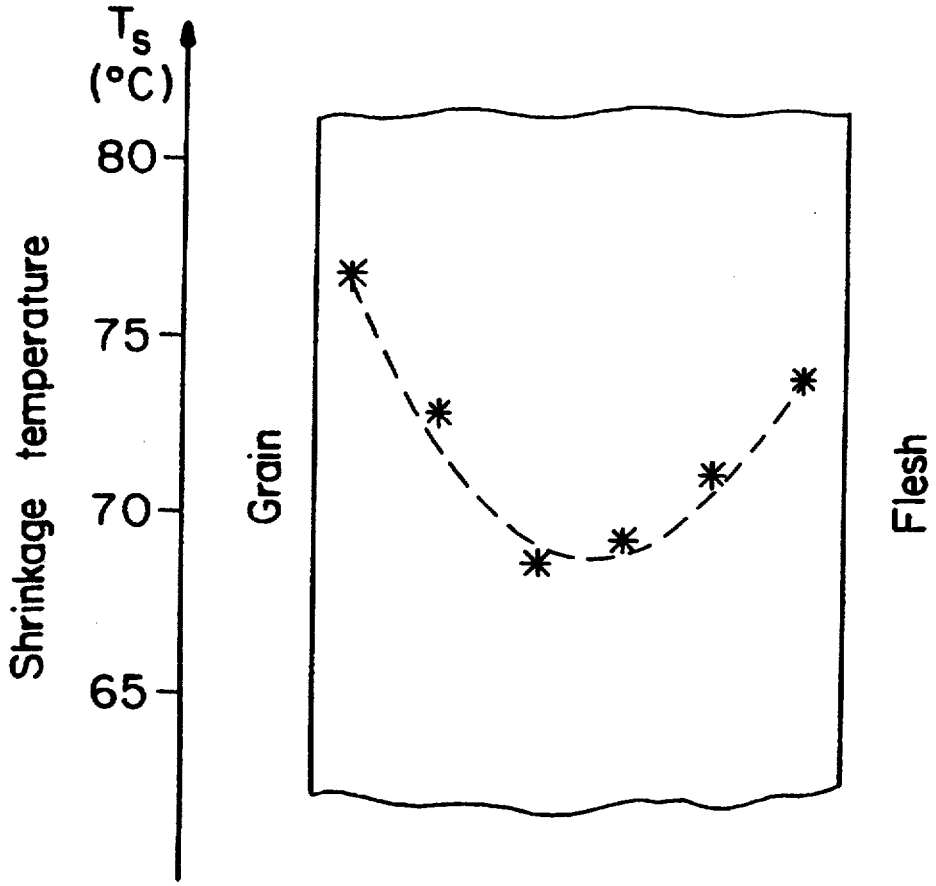

The mixtures according to the invention are prepared as follows:

One mole of an aliphatic ω,ω'-dialdehyde of 2–8 carbon atoms in the form of an aqueous solution (3–60%, preferably 35–55%) is acidified with organic or inorganic acid to a pH of from 2.0 to 5.0, preferably of from 3.5 to 4.5, and mixed with 0.2–4 moles of the hydroxy compounds according to the invention. Standing at room temperature for several hours or briefly heating gives the tanning agent formulation according to the invention.

For pretanning, the amount of dialdehyde present in the tanning agent formulations should be within the range 0.2–1.0%, preferably 0.3–0.6%, (based on 100% strength ω,ω'-dialdehyde and based on pelt weight).

Figure 2:
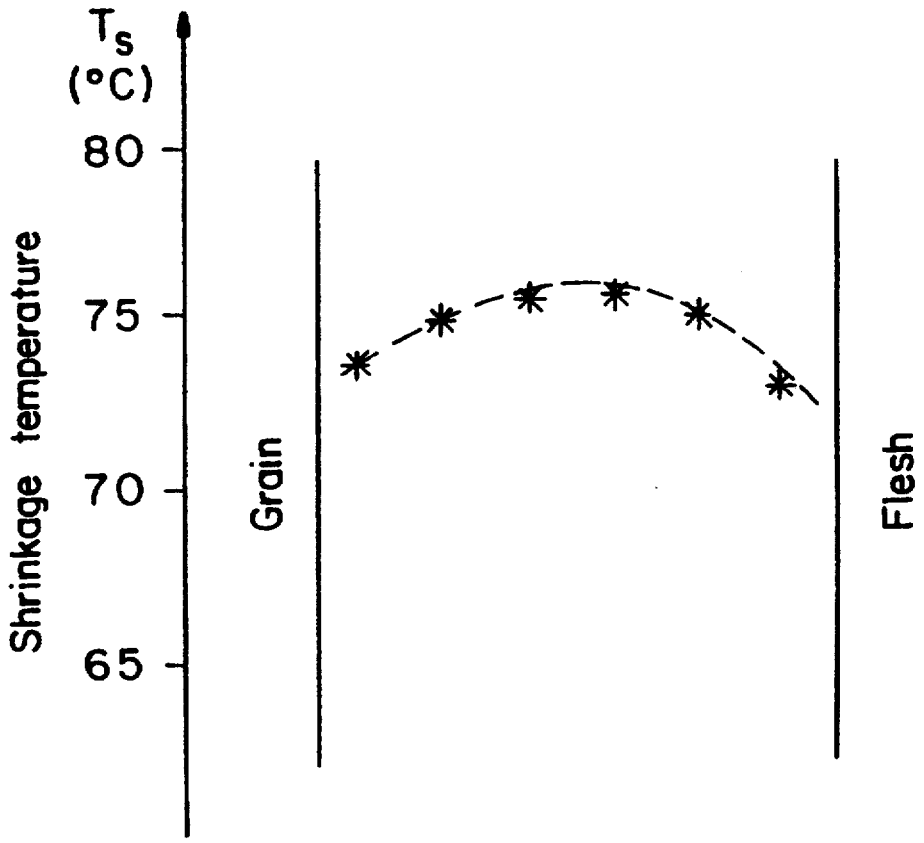

Formulations of this type based on technical grade glutardialdehyde lead if used for example in an amount of 0.5% (based on 100% of the glutardialdehyde present in the formulation and based on pelt weight) in pretanning, to essentially uniform crosslinking in the hide tissue cross-section, as can be seen from the shrinkage temperatures (see FIG. 2 *which shows thermal stability in leather cross-section after treatment with the formulation according to the invention based on technical grade glutardialdehyde (0.5% based on 100% of glutardialdehyde present in the formulation and based on pelt weight).*

FIGS. 1) and 2) clearly show the difference in tanning behavior between technical grade glutardialdehyde and the agent according to the invention. This difference is responsible for the advantages of the agent according to the present invention when used in pretanning. These advantages include increased shrinkage temperature, in particular in the inner zones, permitting satisfactory samming and shaving; long shelf life of the pretanned semifinished product; improved mold resistance of the pretanned semifinished products produced according to the invention, without addition of preservatives, compared to conventional semifinished products; and easy and complete wettability of the dried semifinished product.

It is surprising that even raw materials containing high levels of natural fats are satisfactorily retannable with the formulations according to the invention. Furthermore, in the finished, pretanned leather, the fat and chromium distribution in the vertical leather cross section is more uniform than with a conventional leather produced in a similar manner.

Technical grade glutardialdehyde leads in pretanning to strongly yellow products. In contrast, the use of the formulations according to the invention in pretanning leads to significantly more light-colored products which even make it possible to manufacture white leathers.

A further advantage is that shavings and trimmings are free of metal salts and therefore constitute reusable and useful by-products, effective as fertilizers or adsorbents, for example, rather than waste or even special category waste.

It has emerged as a very particular advantage that, owing to the uniform crosslinking action of the tanning agent formulations according to the invention, full tanning with chromium salts of the sammed and shaved products obtained requires a smaller amount of chrome tannins (about 1.5% of chromium(III) oxide on shaved weight), as a result of which it is no problem to obtain residual chromium contents in the final liquor at a liquor length of 100% of less than 0.2 g of chromium(III) oxide per liter, substantially cutting the level of pollutants in the wastewater.

The examples below illustrate the invention without limiting it. In the examples, parts and percentages are by weight.

The ω,ω'-dialdehydes used are preferably glutardialdehyde, succindialdehyde and adipindialdehyde in the form of 25–50% strength aqueous solutions. The hydroxy compounds used are preferably short-chain alkylglycols, alkylpolyglycols, aliphatic alcohols, glycerol and saccharides.

EXAMPLE 1

100 parts of 50% strength aqueous glutardialdehyde are mixed with 50 parts of ethylene glycol monobutyl ether (2-butoxyethanol), the mixture is brought to pH 3.5 with formic acid and the temperature is raised with reflux cooling to 50° C. This temperature of 50° C. is maintained for 15 minutes, and the tanning agent formulation is then cooled down to room temperature.

This tanning agent formulation is used for treatment of bovine upper leather as follows:

The pelt to be converted into bovine leather is removed from the lime liquor, split to 3.3–3.6 mm, then rinsed in water at 35° C. for 10 minutes, after which the liquor is drained. The rinsing and draining are then repeated. Then the pelt is treated in a solution comprising 50.00% of water at 35° C. and 0.30% of sodium hypochlorite solution (about 10% of Cl) for 10 minutes, whereupon 2.2% of a commercially available deliming agent, $(NH_4)_2SO_4$, and 0.40% of a commercially available surfactant are added. Treatment continues for 60 minutes, and the liquor is drained. Next, the pelt is treated in a solution comprising 100.00% of water at 35° C. and 0.06% of a commercially available bating product (10,000 LV) for 45 minutes, and the liquor is drained. The pelt is then washed twice with 200.00% of water (28°–23° C.) for 10 minutes each time. The pelt should then be lime-free.

Pickling is next performed, wherein the pelt is treated with a solution comprising 50.00% of water at 23° C., 8.00% of sodium chloride, density≧6.5 Be (1.046 g/cm$^3$), for 10 minutes. Then 0.80% of 85% strength formic acid (1:5 with water) is added, and treatment continues for 30 minutes. Next, 0.20% of 98% strength sulfuric acid (1:10 with water) is added and treatment continues for 10 minutes.

Pretanning in the pickling liquor is then performed, wherein 1.50% of the tanning agent described above is added; after 2 hours the Ts rises to above 70° C. The pretanning proceeds overnight. The final pH is 3.9–4.8 and the final Ts at 72°–77° C. The liquor is then drained. The leather is then sammed, classified and shaved to a thickness about 20% less than is required in the finished leather.

The main tanning is then performed (the percentages are based on shaved weight). The pretanned leather is washed with 200.00% of water at 25° C. for 10 minutes, and the liquor is drained. Then the leather is treated with 100.00% of water at 25° C., with 6.00% of a commercially available 33% basicity chrome tanning agent (corresponding to 1.7% of chromium (III) oxide), which is added undissolved, for 60 minutes. Then 0.40% of magnesium oxide is added, and the leather is treated overnight. Then the leather is further processed in the usual manner.

EXAMPLE 2

200 parts of 25% strength succindialdehyde are mixed with 70 parts of glycerol, and the mixture is brought to pH 3.7 with formic acid and left to stand for 12 hours.

This tanning agent is used for treatment of sheepskin clothing leather as follows:

Pickled sheep pelts are drummed in a solution comprising 100.00% of water at 30° C., 5.00% of sodium chloride and 0.50% of commercially available surfactants for 10 minutes to open up the pelts and remove creases. The liquor is then drained.

Depickling and pretanning are then performed. The pelts are treated in a solution comprising 50.00% of water at 30° C., 5.00% of sodium chloride, and 1.60% of sodium bicarbonate for 60 minutes. Then 0.70% of formic acid (1:5) is added for 10 minutes. Next, 3.00% of the tanning agent is added for 120 minutes. Then, 2.00% of commercially available surfactants are added for 30 minutes. The resultant pH is 3.5–3.8, and Ts is 69°–72° C. The liquor is then drained. Next, 100.00% of water is added, at an inlet temperature of 60° C. and a working temperature of 40°–45° C. for 60 minutes, and the liquor is drained. The pelts are then washed twice with 200.00% of water at 35°-25° C.

The main tanning is then performed. The pretanned leather is treated in a solution comprising 50.00% of water at 25° C., to which is added 5.00% of sodium chloride for 10 minutes. Then 6.00% of commercially available 33% basicity chromium tanning agent (corresponding to 1.7% of chromium(III) oxide) is added undissolved for 60 minutes. The liquor is drained, and replaced by 100.00% of water at 30° C., to which is added 0.30% of magnesium oxide and 1.00% of commercially available sulfited fat liquor. The tanning proceeds overnight, followed by further processing as usual.

What is claimed is:

1. A process for manufacturing a semifinished leather product, which comprises the steps of pickling a pelt and pretanning said pickled pelt with a tanning agent formulation obtained by reacting 1 mole of an aliphatic ω,ω'-[dialedehyde] *dialdehyde* having 2–8 carbon atoms in the form of an *about 3–60% by weight* aqueous solution [of about 3–60% strength] with about 0.2–4 moles of a hydroxy compound [of] *selected from the group consisting of glycerol, a saccharide and a compound having* the formula I $$[R_1-[(C_2H_4O)x-(C_3H_6O)y-(C_4H_8O)z]n-H \quad (I)]$$

$$R_1-O-[(C_2H_4O)_x-(C_3H_6O)_y-(C_4H_8O)_z]_n-H \quad (I)$$

[whereby] *wherein* n is an integer from [0] *1* to 10, x+y+z is an integer from 1 to 20, wherein the alkoxy groups [may be] *are* arranged in any order, and $R_1$ is H, $C_1$–$C_{12}$ alkyl, or $C_1$–$C_{12}$ alkyl having one or more hydroxyl groups[,].

wherein n is not O for $R^1$=H.]

2. The process of claim 1 wherein said tanning agent is produced in a reaction medium having a pH from about 2 to 5.

3. The process of claim 2 wherein said tanning agent is produced in a reaction medium having a pH from 3.5 to 4.5.

4. The process of claim 1 wherein the amount of said ω, ω'-dialdehyde present in the tanning agent formulation is about 0.2–1.0%, based on 100% [strength] dialdehyde and based on pelt weight.

5. The process of claim [1] *4* wherein the amount of said ω, ω'-dialdehyde present in the tanning agent formulation is 0.3–0.6%.

6. The process of claim 1 wherein said ω, ω'-dialdehyde is glutardialdehyde, succindialdehyde or adipindialdehyde.

7. The process of claim 1 wherein said hydroxy compound is an alkylglycol, alkylpolyglycol, [aliphatic alcohol,] glycerol or [saccaride] *saccharide.*

8. The process of claim 1 wherein said hydroxy compound is an alkoxyalcohol.

[9. A process for manufacturing a semifinished leather product, which comprises the steps of pickling a pelt and pretanning said pickled pelt with a tanning agent formulation as claimed in claim 1.]

10. A semifinished leather product produced by the process as claimed in claim 1.

11. The process of claim 1 wherein the tanning agent consists essentially of the recited reaction product.

12. A semifinished leather product produced by the process as claimed in claim 11.

* * * * *

UNITED STATES PATENT AND TRADEMARK OFFICE

CERTIFICATE OF CORRECTION

PATENT NO. : RE 34,986

DATED : July 4, 1995

INVENTOR(S) : Rathfelder et al

It is certified that error appears in the above-indentified patent and that said Letters Patent is hereby corrected as shown below:

Claim 1, Col. 6, line 37, before "wherein" insert --[--.

Signed and Sealed this

Fourteenth Day of May, 1996

Bruce Lehman

*Attest:*

BRUCE LEHMAN

*Attesting Officer*

*Commissioner of Patents and Trademarks*